United States Patent
Inayoshi

(10) Patent No.: US 9,789,718 B2
(45) Date of Patent: Oct. 17, 2017

(54) PRINTING APPARATUS AND CONTROL METHOD OF THE SAME

(71) Applicant: CANON KABUSHIKI KAISHA, Tokyo (JP)

(72) Inventor: Hisanori Inayoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/159,463

(22) Filed: May 19, 2016

(65) Prior Publication Data

US 2016/0347102 A1  Dec. 1, 2016

(30) Foreign Application Priority Data

May 29, 2015 (JP) ................. 2015-110800

(51) Int. Cl.
- B41J 29/38 (2006.01)
- G06F 3/12 (2006.01)
- G06K 15/02 (2006.01)

(52) U.S. Cl.
CPC .......... B41J 29/38 (2013.01); G06K 15/1817 (2013.01)

(58) Field of Classification Search
CPC ..... B41J 2/2132; B41J 11/008; G06K 15/107; G06K 15/10
See application file for complete search history.

(56) References Cited

U.S. PATENT DOCUMENTS

| | | | | |
|---|---|---|---|---|
| 8,164,793 B2* | 4/2012 | Fujita | ................... | G06K 15/107 347/14 |
| 8,608,271 B2* | 12/2013 | Murayama | ............. | B41J 2/2132 347/15 |
| 9,144,996 B2* | 9/2015 | Yoshida | ................. | B41J 2/2103 |
| 9,254,692 B2 | 2/2016 | Fujimoto | | |
| 2002/0021319 A1* | 2/2002 | Kawatoko | ............. | B41J 2/2132 347/15 |
| 2003/0214555 A1* | 11/2003 | Teshigawara | .......... | B41J 19/147 347/43 |
| 2011/0187775 A1* | 8/2011 | Masada | .................... | B41J 29/38 347/12 |
| 2013/0194329 A1* | 8/2013 | Fujimoto | ................... | B41J 2/07 347/9 |
| 2014/0092403 A1* | 4/2014 | Miyazaki | ............. | H04N 1/4051 358/1.8 |

FOREIGN PATENT DOCUMENTS

| | | |
|---|---|---|
| JP | 2007-118595 | 5/2007 |
| JP | 2013-154590 | 8/2013 |

* cited by examiner

Primary Examiner — Stephen Meier
Assistant Examiner — John P Zimmermann
(74) Attorney, Agent, or Firm — Fitzpatrick, Cella, Haper & Scinto

(57) ABSTRACT

When performing printing for every M columns, a print buffer stores printing data by dividing the data into M groups. When data is multilevel data or when performing no column thinning printing, the print buffer stores the data without dividing it. When data to be stored in the print buffer is binary data and printing is to be performed for every M columns, printing data is stored as it is divided into M groups, and these data groups are read out as they are switched for each scan of the printhead. When data to be stored in the print buffer is multilevel data or when performing no column thinning printing, data is read out without switching readout regions.

19 Claims, 9 Drawing Sheets

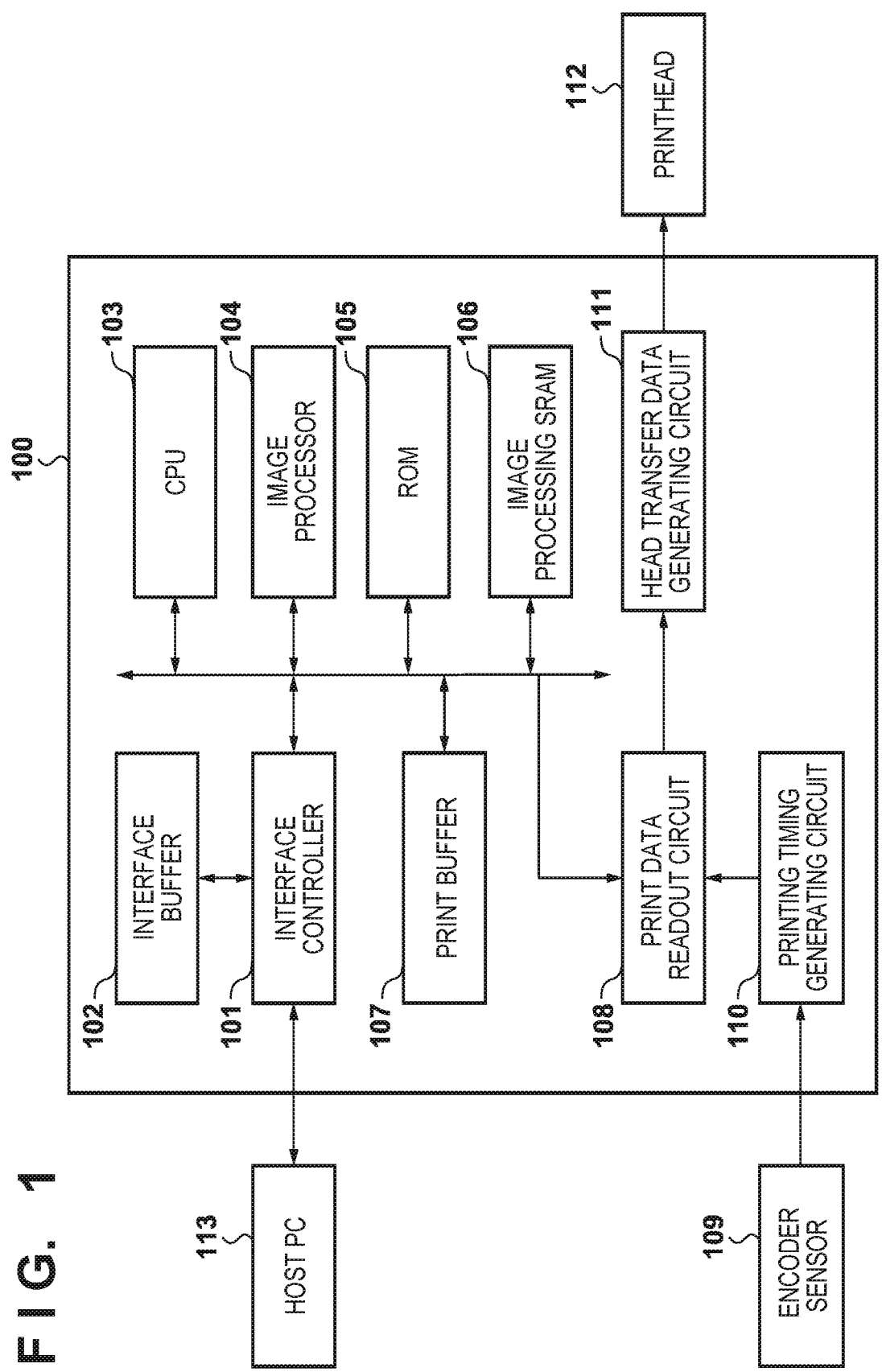

FIG. 2A

| Address | D63 | D48 | D32 | D16 | D0 |
|---|---|---|---|---|---|
| ADDRESS 0x00 | 4TH RASTER (1ST TO 16TH COLUMNS) | 3RD RASTER (1ST TO 16TH COLUMNS) | 2ND RASTER (1ST TO 16TH COLUMNS) | 1ST RASTER (1ST TO 16TH COLUMNS) | |
| ADDRESS 0x01 | 8TH RASTER (1ST TO 16TH COLUMNS) | 7TH RASTER (1ST TO 16TH COLUMNS) | 6TH RASTER (1ST TO 16TH COLUMNS) | 5TH RASTER (1ST TO 16TH COLUMNS) | |
| ADDRESS 0x02 | 12TH RASTER (1ST TO 16TH COLUMNS) | 11TH RASTER (1ST TO 16TH COLUMNS) | 10TH RASTER (1ST TO 16TH COLUMNS) | 9TH RASTER (1ST TO 16TH COLUMNS) | |
| ADDRESS 0x03 | 16TH RASTER (1ST TO 16TH COLUMNS) | 15TH RASTER (1ST TO 16TH COLUMNS) | 14TH RASTER (1ST TO 16TH COLUMNS) | 13TH RASTER (1ST TO 16TH COLUMNS) | |
| ADDRESS 0x04 | 20TH RASTER (1ST TO 16TH COLUMNS) | 19TH RASTER (1ST TO 16TH COLUMNS) | 18TH RASTER (1ST TO 16TH COLUMNS) | 17TH RASTER (1ST TO 16TH COLUMNS) | |
| ADDRESS 0x05 | 24TH RASTER (1ST TO 16TH COLUMNS) | 23RD RASTER (1ST TO 16TH COLUMNS) | 22ND RASTER (1ST TO 16TH COLUMNS) | 21ST RASTER (1ST TO 16TH COLUMNS) | |
| ADDRESS 0x06 | 28TH RASTER (1ST TO 16TH COLUMNS) | 27TH RASTER (1ST TO 16TH COLUMNS) | 26TH RASTER (1ST TO 16TH COLUMNS) | 25TH RASTER (1ST TO 16TH COLUMNS) | |
| ADDRESS 0x07 | 32ND RASTER (1ST TO 16TH COLUMNS) | 31ST RASTER (1ST TO 16TH COLUMNS) | 30TH RASTER (1ST TO 16TH COLUMNS) | 29TH RASTER (1ST TO 16TH COLUMNS) | |
| ADDRESS 0x10 | 36TH RASTER (1ST TO 16TH COLUMNS) | 35TH RASTER (1ST TO 16TH COLUMNS) | 34TH RASTER (1ST TO 16TH COLUMNS) | 33RD RASTER (1ST TO 16TH COLUMNS) | |
| ADDRESS 0x11 | 40TH RASTER (1ST TO 16TH COLUMNS) | 39TH RASTER (1ST TO 16TH COLUMNS) | 38TH RASTER (1ST TO 16TH COLUMNS) | 37TH RASTER (1ST TO 16TH COLUMNS) | |
| ADDRESS 0x12 | 44TH RASTER (1ST TO 16TH COLUMNS) | 43RD RASTER (1ST TO 16TH COLUMNS) | 42ND RASTER (1ST TO 16TH COLUMNS) | 41ST RASTER (1ST TO 16TH COLUMNS) | |
| ADDRESS 0x13 | 48TH RASTER (1ST TO 16TH COLUMNS) | 47TH RASTER (1ST TO 16TH COLUMNS) | 46TH RASTER (1ST TO 16TH COLUMNS) | 45TH RASTER (1ST TO 16TH COLUMNS) | |
| ADDRESS 0x14 | 52ND RASTER (1ST TO 16TH COLUMNS) | 51ST RASTER (1ST TO 16TH COLUMNS) | 50TH RASTER (1ST TO 16TH COLUMNS) | 49TH RASTER (1ST TO 16TH COLUMNS) | |
| ADDRESS 0x15 | 56TH RASTER (1ST TO 16TH COLUMNS) | 55TH RASTER (1ST TO 16TH COLUMNS) | 54TH RASTER (1ST TO 16TH COLUMNS) | 53RD RASTER (1ST TO 16TH COLUMNS) | |
| ADDRESS 0x16 | 60TH RASTER (1ST TO 16TH COLUMNS) | 59TH RASTER (1ST TO 16TH COLUMNS) | 58TH RASTER (1ST TO 16TH COLUMNS) | 57TH RASTER (1ST TO 16TH COLUMNS) | |
| ADDRESS 0x17 | 64TH RASTER (1ST TO 16TH COLUMNS) | 63RD RASTER (1ST TO 16TH COLUMNS) | 62ND RASTER (1ST TO 16TH COLUMNS) | 61ST RASTER (1ST TO 16TH COLUMNS) | |

FIG. 2B

| | D63 | | D48 | | D32 | | D16 | | D0 |
|---|---|---|---|---|---|---|---|---|---|
| ADDRESS 0x00 | | 4TH RASTER (1ST TO 16TH COLUMNS) | | 3RD RASTER (1ST TO 16TH COLUMNS) | | 2ND RASTER (1ST TO 16TH COLUMNS) | | 1ST RASTER (1ST TO 16TH COLUMNS) | |
| ADDRESS 0x01 | | 8TH RASTER (1ST TO 16TH COLUMNS) | | 7TH RASTER (1ST TO 16TH COLUMNS) | | 6TH RASTER (1ST TO 16TH COLUMNS) | | 5TH RASTER (1ST TO 16TH COLUMNS) | |
| ADDRESS 0x02 | | 12TH RASTER (1ST TO 16TH COLUMNS) | | 11TH RASTER (1ST TO 16TH COLUMNS) | | 10TH RASTER (1ST TO 16TH COLUMNS) | | 9TH RASTER (1ST TO 16TH COLUMNS) | |
| ADDRESS 0x03 | | 16TH RASTER (1ST TO 16TH COLUMNS) | | 15TH RASTER (1ST TO 16TH COLUMNS) | | 14TH RASTER (1ST TO 16TH COLUMNS) | | 13TH RASTER (1ST TO 16TH COLUMNS) | |
| ADDRESS 0x04 | | 20TH RASTER (1ST TO 16TH COLUMNS) | | 19TH RASTER (1ST TO 16TH COLUMNS) | | 18TH RASTER (1ST TO 16TH COLUMNS) | | 17TH RASTER (1ST TO 16TH COLUMNS) | |
| ADDRESS 0x05 | | 24TH RASTER (1ST TO 16TH COLUMNS) | | 23RD RASTER (1ST TO 16TH COLUMNS) | | 22ND RASTER (1ST TO 16TH COLUMNS) | | 21ST RASTER (1ST TO 16TH COLUMNS) | |
| ADDRESS 0x06 | | 28TH RASTER (1ST TO 16TH COLUMNS) | | 27TH RASTER (1ST TO 16TH COLUMNS) | | 26TH RASTER (1ST TO 16TH COLUMNS) | | 25TH RASTER (1ST TO 16TH COLUMNS) | |
| ADDRESS 0x07 | | 32ND RASTER (1ST TO 16TH COLUMNS) | | 31ST RASTER (1ST TO 16TH COLUMNS) | | 30TH RASTER (1ST TO 16TH COLUMNS) | | 29TH RASTER (1ST TO 16TH COLUMNS) | |
| | D63 | | D48 | | D32 | | D16 | | D0 |
| ADDRESS 0x10 | | 4TH RASTER (17TH TO 32ND COLUMNS) | | 3RD RASTER (17TH TO 32ND COLUMNS) | | 2ND RASTER (17TH TO 32ND COLUMNS) | | 1ST RASTER (17TH TO 32ND COLUMNS) | |
| ADDRESS 0x11 | | 8TH RASTER (17TH TO 32ND COLUMNS) | | 7TH RASTER (17TH TO 32ND COLUMNS) | | 6TH RASTER (17TH TO 32ND COLUMNS) | | 5TH RASTER (17TH TO 32ND COLUMNS) | |
| ADDRESS 0x12 | | 12TH RASTER (17TH TO 32ND COLUMNS) | | 11TH RASTER (17TH TO 32ND COLUMNS) | | 10TH RASTER (17TH TO 32ND COLUMNS) | | 9TH RASTER (17TH TO 32ND COLUMNS) | |
| ADDRESS 0x13 | | 16TH RASTER (17TH TO 32ND COLUMNS) | | 15TH RASTER (17TH TO 32ND COLUMNS) | | 14TH RASTER (17TH TO 32ND COLUMNS) | | 13TH RASTER (17TH TO 32ND COLUMNS) | |
| ADDRESS 0x14 | | 20TH RASTER (17TH TO 32ND COLUMNS) | | 19TH RASTER (17TH TO 32ND COLUMNS) | | 18TH RASTER (17TH TO 32ND COLUMNS) | | 17TH RASTER (17TH TO 32ND COLUMNS) | |
| ADDRESS 0x15 | | 24TH RASTER (17TH TO 32ND COLUMNS) | | 23RD RASTER (17TH TO 32ND COLUMNS) | | 22ND RASTER (17TH TO 32ND COLUMNS) | | 21ST RASTER (17TH TO 32ND COLUMNS) | |
| ADDRESS 0x16 | | 28TH RASTER (17TH TO 32ND COLUMNS) | | 27TH RASTER (17TH TO 32ND COLUMNS) | | 26TH RASTER (17TH TO 32ND COLUMNS) | | 25TH RASTER (17TH TO 32ND COLUMNS) | |
| ADDRESS 0x17 | | 32ND RASTER (17TH TO 32ND COLUMNS) | | 31ST RASTER (17TH TO 32ND COLUMNS) | | 30TH RASTER (17TH TO 32ND COLUMNS) | | 29TH RASTER (17TH TO 32ND COLUMNS) | |

F I G. 4A

| | D63 | D48 | D32 | D16 | D0 |
|---|---|---|---|---|---|
| ADDRESS 0x00 | 4TH RASTER (1ST TO 16TH COLUMNS) | 3RD RASTER (1ST TO 16TH COLUMNS) | 2ND RASTER (1ST TO 16TH COLUMNS) | 1ST RASTER (1ST TO 16TH COLUMNS) | |
| ADDRESS 0x01 | 8TH RASTER (1ST TO 16TH COLUMNS) | 7TH RASTER (1ST TO 16TH COLUMNS) | 6TH RASTER (1ST TO 16TH COLUMNS) | 5TH RASTER (1ST TO 16TH COLUMNS) | |
| ADDRESS 0x02 | 12TH RASTER (1ST TO 16TH COLUMNS) | 11TH RASTER (1ST TO 16TH COLUMNS) | 10TH RASTER (1ST TO 16TH COLUMNS) | 9TH RASTER (1ST TO 16TH COLUMNS) | |
| ADDRESS 0x03 | 16TH RASTER (1ST TO 16TH COLUMNS) | 15TH RASTER (1ST TO 16TH COLUMNS) | 14TH RASTER (1ST TO 16TH COLUMNS) | 13TH RASTER (1ST TO 16TH COLUMNS) | |
| ADDRESS 0x04 | 20TH RASTER (1ST TO 16TH COLUMNS) | 19TH RASTER (1ST TO 16TH COLUMNS) | 18TH RASTER (1ST TO 16TH COLUMNS) | 17TH RASTER (1ST TO 16TH COLUMNS) | |
| ADDRESS 0x05 | 24TH RASTER (1ST TO 16TH COLUMNS) | 23RD RASTER (1ST TO 16TH COLUMNS) | 22ND RASTER (1ST TO 16TH COLUMNS) | 21ST RASTER (1ST TO 16TH COLUMNS) | |
| ADDRESS 0x06 | 28TH RASTER (1ST TO 16TH COLUMNS) | 27TH RASTER (1ST TO 16TH COLUMNS) | 26TH RASTER (1ST TO 16TH COLUMNS) | 25TH RASTER (1ST TO 16TH COLUMNS) | |
| ADDRESS 0x07 | 32ND RASTER (1ST TO 16TH COLUMNS) | 31ST RASTER (1ST TO 16TH COLUMNS) | 30TH RASTER (1ST TO 16TH COLUMNS) | 29TH RASTER (1ST TO 16TH COLUMNS) | |
| ADDRESS 0x10 | 4TH RASTER (17TH TO 32ND COLUMNS) | 3RD RASTER (17TH TO 32ND COLUMNS) | 2ND RASTER (17TH TO 32ND COLUMNS) | 1ST RASTER (17TH TO 32ND COLUMNS) | |
| ADDRESS 0x11 | 8TH RASTER (17TH TO 32ND COLUMNS) | 7TH RASTER (17TH TO 32ND COLUMNS) | 6TH RASTER (17TH TO 32ND COLUMNS) | 5TH RASTER (17TH TO 32ND COLUMNS) | |
| ADDRESS 0x12 | 12TH RASTER (17TH TO 32ND COLUMNS) | 11TH RASTER (17TH TO 32ND COLUMNS) | 10TH RASTER (17TH TO 32ND COLUMNS) | 9TH RASTER (17TH TO 32ND COLUMNS) | |
| ADDRESS 0x13 | 16TH RASTER (17TH TO 32ND COLUMNS) | 15TH RASTER (17TH TO 32ND COLUMNS) | 14TH RASTER (17TH TO 32ND COLUMNS) | 13TH RASTER (17TH TO 32ND COLUMNS) | |
| ADDRESS 0x14 | 20TH RASTER (17TH TO 32ND COLUMNS) | 19TH RASTER (17TH TO 32ND COLUMNS) | 18TH RASTER (17TH TO 32ND COLUMNS) | 17TH RASTER (17TH TO 32ND COLUMNS) | |
| ADDRESS 0x15 | 24TH RASTER (17TH TO 32ND COLUMNS) | 23RD RASTER (17TH TO 32ND COLUMNS) | 22ND RASTER (17TH TO 32ND COLUMNS) | 21ST RASTER (17TH TO 32ND COLUMNS) | |
| ADDRESS 0x16 | 28TH RASTER (17TH TO 32ND COLUMNS) | 27TH RASTER (17TH TO 32ND COLUMNS) | 26TH RASTER (17TH TO 32ND COLUMNS) | 25TH RASTER (17TH TO 32ND COLUMNS) | |
| ADDRESS 0x17 | 32ND RASTER (17TH TO 32ND COLUMNS) | 31ST RASTER (17TH TO 32ND COLUMNS) | 30TH RASTER (17TH TO 32ND COLUMNS) | 29TH RASTER (17TH TO 32ND COLUMNS) | |

F I G. 4B

| Address | D63 | D48 | D32 | D16 | D0 |
|---|---|---|---|---|---|
| ADDRESS 0x20 | 4TH RASTER (33RD TO 48TH COLUMNS) | 3RD RASTER (33RD TO 48TH COLUMNS) | 2ND RASTER (33RD TO 48TH COLUMNS) | 1ST RASTER (33RD TO 48TH COLUMNS) | |
| ADDRESS 0x21 | 8TH RASTER (33RD TO 48TH COLUMNS) | 7TH RASTER (33RD TO 48TH COLUMNS) | 6TH RASTER (33RD TO 48TH COLUMNS) | 5TH RASTER (33RD TO 48TH COLUMNS) | |
| ADDRESS 0x22 | 12TH RASTER (33RD TO 48TH COLUMNS) | 11TH RASTER (33RD TO 48TH COLUMNS) | 10TH RASTER (33RD TO 48TH COLUMNS) | 9TH RASTER (33RD TO 48TH COLUMNS) | |
| ADDRESS 0x23 | 16TH RASTER (33RD TO 48TH COLUMNS) | 15TH RASTER (33RD TO 48TH COLUMNS) | 14TH RASTER (33RD TO 48TH COLUMNS) | 13TH RASTER (33RD TO 48TH COLUMNS) | |
| ADDRESS 0x24 | 20TH RASTER (33RD TO 48TH COLUMNS) | 19TH RASTER (33RD TO 48TH COLUMNS) | 18TH RASTER (33RD TO 48TH COLUMNS) | 17TH RASTER (33RD TO 48TH COLUMNS) | |
| ADDRESS 0x25 | 24TH RASTER (33RD TO 48TH COLUMNS) | 23RD RASTER (33RD TO 48TH COLUMNS) | 22ND RASTER (33RD TO 48TH COLUMNS) | 21ST RASTER (33RD TO 48TH COLUMNS) | |
| ADDRESS 0x26 | 28TH RASTER (33RD TO 48TH COLUMNS) | 27TH RASTER (33RD TO 48TH COLUMNS) | 26TH RASTER (33RD TO 48TH COLUMNS) | 25TH RASTER (33RD TO 48TH COLUMNS) | |
| ADDRESS 0x27 | 32ND RASTER (33RD TO 48TH COLUMNS) | 31ST RASTER (33RD TO 48TH COLUMNS) | 30TH RASTER (33RD TO 48TH COLUMNS) | 29TH RASTER (33RD TO 48TH COLUMNS) | |
| ADDRESS 0x30 | 4TH RASTER (49TH TO 64TH COLUMNS) | 3RD RASTER (49TH TO 64TH COLUMNS) | 2ND RASTER (49TH TO 64TH COLUMNS) | 1ST RASTER (49TH TO 64TH COLUMNS) | |
| ADDRESS 0x31 | 8TH RASTER (49TH TO 64TH COLUMNS) | 7TH RASTER (49TH TO 64TH COLUMNS) | 6TH RASTER (49TH TO 64TH COLUMNS) | 5TH RASTER (49TH TO 64TH COLUMNS) | |
| ADDRESS 0x32 | 12TH RASTER (49TH TO 64TH COLUMNS) | 11TH RASTER (49TH TO 64TH COLUMNS) | 10TH RASTER (49TH TO 64TH COLUMNS) | 9TH RASTER (49TH TO 64TH COLUMNS) | |
| ADDRESS 0x33 | 16TH RASTER (49TH TO 64TH COLUMNS) | 15TH RASTER (49TH TO 64TH COLUMNS) | 14TH RASTER (49TH TO 64TH COLUMNS) | 13TH RASTER (49TH TO 64TH COLUMNS) | |
| ADDRESS 0x34 | 20TH RASTER (49TH TO 64TH COLUMNS) | 19TH RASTER (49TH TO 64TH COLUMNS) | 18TH RASTER (49TH TO 64TH COLUMNS) | 17TH RASTER (49TH TO 64TH COLUMNS) | |
| ADDRESS 0x35 | 24TH RASTER (49TH TO 64TH COLUMNS) | 23RD RASTER (49TH TO 64TH COLUMNS) | 22ND RASTER (49TH TO 64TH COLUMNS) | 21ST RASTER (49TH TO 64TH COLUMNS) | |
| ADDRESS 0x36 | 28TH RASTER (49TH TO 64TH COLUMNS) | 27TH RASTER (49TH TO 64TH COLUMNS) | 26TH RASTER (49TH TO 64TH COLUMNS) | 25TH RASTER (49TH TO 64TH COLUMNS) | |
| ADDRESS 0x37 | 32ND RASTER (49TH TO 64TH COLUMNS) | 31ST RASTER (49TH TO 64TH COLUMNS) | 30TH RASTER (49TH TO 64TH COLUMNS) | 29TH RASTER (49TH TO 64TH COLUMNS) | |

PRINTING APPARATUS AND CONTROL METHOD OF THE SAME

BACKGROUND OF THE INVENTION

Field of the Invention

The present invention relates to a technique of performing printing based on image data by scanning a printhead including a plurality of printing elements.

Description of the Related Art

In a printing apparatus disclosed in Japanese Patent Laid-Open No. 2007-118595, raster data is stored in a DRAM called a print buffer and having a burst readout function, and, when a predetermined amount is stored, the stored data is read out and transferred to a printhead after horizontal to vertical (HV) conversion. HV conversion is conversion which rearranges raster data in which pixels are sequentially arranged in the line direction, into data in which the pixels are arranged in accordance with the arrangement of printing elements of a printhead.

On the other hand, it is also possible to perform HV conversion before data is stored in the print buffer, and read out column data. In this case, however, there is the possibility that a predetermined size to be read out by burst readout and a data amount necessary to perform registration adjustment do not match each other. Note that "registration adjustment" is the adjustment of a printing position on a medium, particularly, the adjustment of a printing position in the conveyance direction. In this arrangement, it is necessary to prolong the burst length for data readout, and perform a bit shift operation for cutting out a necessary bit from readout data, that is, the circuit is complicated.

On the other hand, a printing method called column thinning is disclosed in a printing apparatus disclosed in Japanese Patent Laid-Open No. 2013-154590. Column thinning is a printing method of performing a printing operation on only pixel columns (columns) periodically selected from columns arranged in the main scanning direction of a printhead. When column thinning is performed, therefore, a discharge operation is performed in each printing scan at a pixel density lower than the density of actually arranged pixels. Since this can decrease the apparent driving frequency of each individual printing element, it is possible to increase the scanning velocity of a carriage, and increase the printing speed.

Unfortunately, if printing is performed by the column-thinning print mode as described in Japanese Patent Laid-Open No. 2013-154590 when raster data (raster image data) is stored in the print buffer as described in Japanese Patent Laid-Open 2007-118595, data which is read out and discarded is generated with respect to readout raster data. This decreases the effective data readout band in readout from the print buffer. This decrease in effective data readout band may make the printing speed difficult to increase.

SUMMARY OF THE INVENTION

The present invention provides a technique capable of reducing a decrease in memory utilization efficiency during column-thinning printing.

The present invention has the following arrangement.

According to an aspect of the present invention, there is provided a printing apparatus which performs printing based on image data by scanning a printhead including a plurality of printing elements arranged in a direction intersecting a direction of a scan of the printhead, comprising: a print buffer configured to store image data; a conversion unit configured to HV-convert image data, which rearranges raster data in which pixels are sequentially arranged in direction corresponding to the scan of the printhead, into data in which the pixels are arranged in accordance with the arrangement of the plurality of printing elements, and supply the image data to the printhead; and a transfer unit configured to read out data stored in the print buffer and transfers the data to the conversion unit, wherein the print buffer stores image data by dividing the image data into image data groups corresponding to the number of times of scan by the printhead, which completes printing of a region equivalent to one printing width, and in accordance with the image data to be printed, the transfer unit transfers the image data group by group to the conversion unit.

According to the present invention, image data is stored in the print buffer as the data is divided into image data groups corresponding to the number of times of scan by the printhead, which completes printing of a region equivalent to one printing width. Therefore, it is possible to reduce the possibility that data which is not used in printing is contained in data read out from the print buffer, and increase the memory utilization efficiency.

Further features of the present invention will become apparent from the following description of exemplary embodiments with reference to the attached drawings.

BRIEF DESCRIPTION OF THE DRAWINGS

FIG. 1 is a block diagram of a printer controller according to the present invention;

FIGS. 2A and 2B are views showing an image processing RAM according to the first embodiment of the present invention;

FIGS. 4A and 4B are views showing an image processing RAM according to the second embodiment;

DESCRIPTION OF THE EMBODIMENTS

[First Embodiment]

Figure 3A:
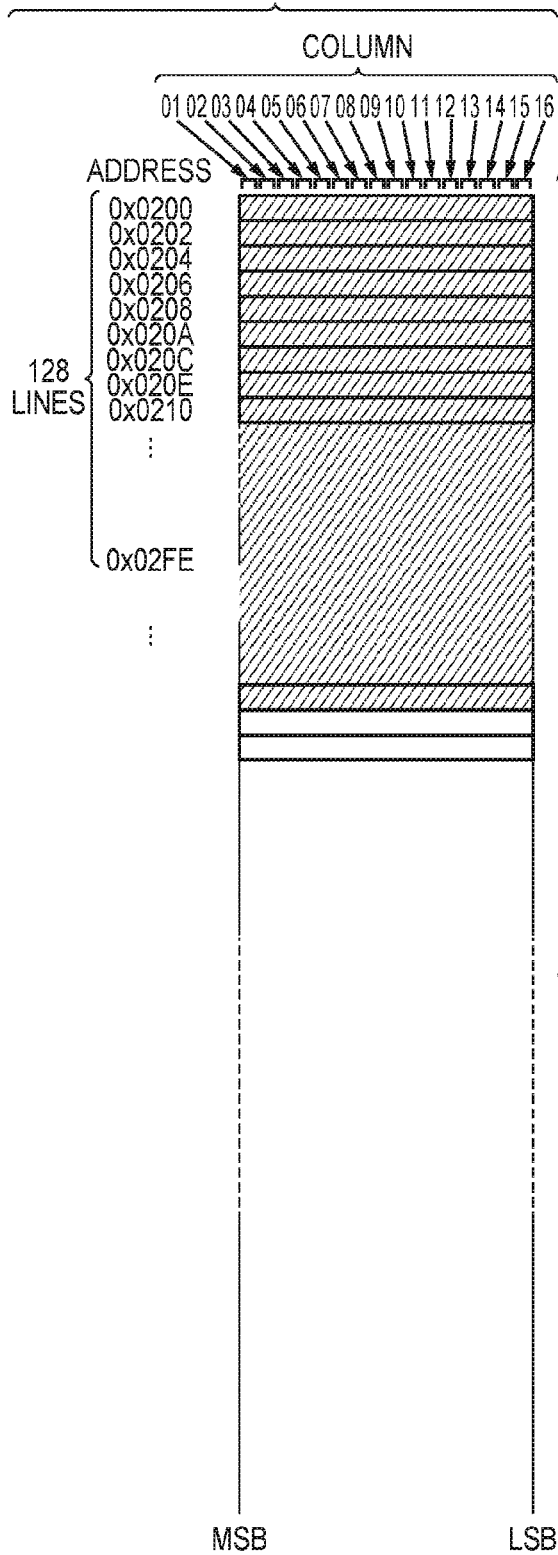
FIGS. 3A and 3B are views showing a print buffer according to the first embodiment of the present invention.

Preferred embodiments of the present invention will be explained in more detail below with reference to the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Moreover, "a printing device" generalizes a discharge port, a channel communicating with the discharge port, and an element which generates energy to be used to discharge ink, unless otherwise specified. "A printing device" is also called a printing element.

<Image Formation Controller>

FIG. 1 is a block diagram of an image formation controller. An image formation controller 100 includes an interface controller 101 for exchanging signals with a host PC, an interface buffer 102 for temporarily storing signals received from the host PC, a CPU 103, an image processor 104, a ROM 105 storing programs of the CPU 103, an image processing SRAM 106 for temporarily storing data when performing image processing, a print buffer 107 for storing print data having undergone image processing, a print data readout circuit 108 for reading out data from the print buffer 107 and supplying the data to a head transfer data generating circuit 111, a printing timing generating circuit 110 for generating an ink discharge timing based on a signal input from an encoder sensor 109, and the head transfer data generating circuit 111 for HV-converting data and transmitting the data to a printhead 112. An internal bus connects the individual blocks to each other. HV conversion is, for example, conversion by which raster image data in which pixels (or dots) are arranged in the raster order in the line (or row) direction is rearranged such that a predetermined number (for example, the height of the printhead) of pixels are arranged in the column direction perpendicular to the line direction, and these pixel columns are arranged in the line direction. In this embodiment, "printing" means the formation (or marking) of not only characters but also general images on a medium.

A print job input from a host PC 113 is stored in the interface buffer 102 via the interface controller 101. The CPU 103 decompresses the data stored in the interface buffer 102, and inputs the data to the image processing SRAM 106. After storing a predetermined amount of data in the image processing SRAM 106, the CPU 103 sends an activation instruction to the image processor 104. Upon receiving this activation instruction, the image processor 104 reads out the image data stored in the image processing SRAM 106, and causes an internal color converter (not shown) to decompose the data into ink colors of the printing apparatus. After that, in accordance with a print mode contained in the print job, data corresponding to each of the decomposed colors is stored in the print buffer 107 if the print mode is a mode of printing multilevel data. If the print mode is a mode of printing binary image data, an internal binarizer of the image processor 104 converts multilevel image data into binary image data for each ink color, and image processing such as boundary processing or a non-discharge complementing process is performed. Then, the data is stored in the print buffer 107.

When the data stored in the print buffer 107 has reached a predetermined data amount, the image processor 104 outputs an interrupt to the CPU 103, and notifies the CPU 103 of the completion of a printing preparation for one scan. When detecting this interrupt, the CPU 103 sends an instruction to move a carriage on which the printhead 112 is mounted in the scanning direction.

The operation of the carriage is input to the image formation controller 100 by a detection value of the encoder sensor 109. Based on this input from the encoder sensor 109, the printing timing generating circuit 110 generates a readout timing, and designates the readout timing to the print data readout circuit 108. The print data readout circuit 108 reads out the data stored in the print buffer 107 at the designated timing. The print data readout circuit 108 performs data readout by, for example, a burst mode, and transfers the readout data to the head transfer data generating circuit 111. The head transfer data generating circuit 111 HV-converts the data received from the print data readout circuit 108 and transfers the data to the printhead 112, and the printhead 112 prints the print data. To simplify the following explanation, the way a system using four colors Bk, C, M, and Y processes Bk will be explained below.

<Examples of Arrangement of Data in Image Processing SRAM in Normal Mode>

FIGS. 2A and 2B show the way the image processing SRAM 106 stores binary data having undergone image processing. The image processing SRAM 106 has 64 bits per address. Also, the print buffer 107 has eight bits per address. FIG. 2A shows the structure of data in a print mode (also called a normal mode) in which no column thinning is performed. FIG. 2B shows the structure of data in a print mode (also called interpolation printing or an interpolation mode) in which two-column thinning is performed.

The way the image processing SRAM 106 stores data in the print mode in which no column thinning is performed will be explained with reference to FIG. 2A. After performing predetermined image processing, the image processor 104 stores data once in the image processing SRAM 106 by the arrangement as shown in FIG. 2A. Referring to FIG. 2A, data of the first to 16th columns of the first raster are stored in bits D15 to D0 at address 0x00. Data of the first to 16th columns of the second raster are stored in bits D31 to D16. Likewise, data of the first to 16th columns of the third raster are stored in bits D47 to D32, and data of the first to 16th columns of the fourth raster are stored in bits D63 to D48. Data of the first to 16th columns of the fifth, sixth, seventh, . . . , 32nd rasters are similarly stored at addresses 0x01 to 0x07.

Referring to FIG. 2A, data of the first to 16th columns of the 33rd raster are stored in bits D15 to D0 at address 0x10. Data of the first to 16th columns of the 34th raster are stored in bits D31 to D16. Likewise, data of the first to 16th columns of the 35th raster are stored in bits D47 to D32, and data of the first to 16th columns of the 36th raster are stored in bits D63 to D48. Data of the first to 16th columns of the 37th, 38th, 39th, . . . , 64th rasters are analogously stored at addresses 0x11 to 0x17.

In the print mode in which no column thinning is performed, storage of data to the print buffer 107 is started when the data of the first to 16th columns of the 64th raster are stored in the image processing SRAM 106. When data is stored at address 0x17, the image processor 104 reads out 64 bits of data at address 0x00, and writes the data of 16 bits D15 to D0 as the data of the first to 16th columns of the first raster at address 0x0200 of the print buffer 107 shown in FIG. 3A. Then, the image processor 104 writes the data of 16 bits D31 to D16 as the data of the first to 16th columns of the second raster at address 0x0202, the data of 16 bits D47 to D32 as the data of the first to 16th columns of the third raster at address 0x0204, and the data of 16 bits D63 to D48 as the data of the first to 16th columns of the fourth raster at address 0x0206. After that, the image processor 104 similarly reads out the 64-bit data stored at addresses 0x01, 0x02, . . . of the image processing SRAM 106, cuts the readout data for every 16 bits, and stores the cut data at consecutive addresses of the print buffer 107.

After reading out the data from address 0x00 of the image processing SRAM 106 and storing the data in the print buffer 107, the image processor 104 overwrites the data of the first to 16th columns of the 65th, 66th, 67th, and 68th rasters at address 0x00. After that, the image processor 104 similarly stores the data at addresses 0x01, 0x02, . . . in the print buffer 107, and overwrites the 69th, 70th, 71st, 72nd, . . . raster data at addresses 0x01, 0x02, . . . . When data is stored at address 0x17, the image processor 104 writes data for every 16 columns in locations having consecutive addresses in the print buffer, following the above-described procedure. When the stored data is transferred to the print buffer 107, dot data to be processed next is stored in the image processing SRAM 106.

<Example of Arrangement of Data in Print Buffer>

Figure 3B:
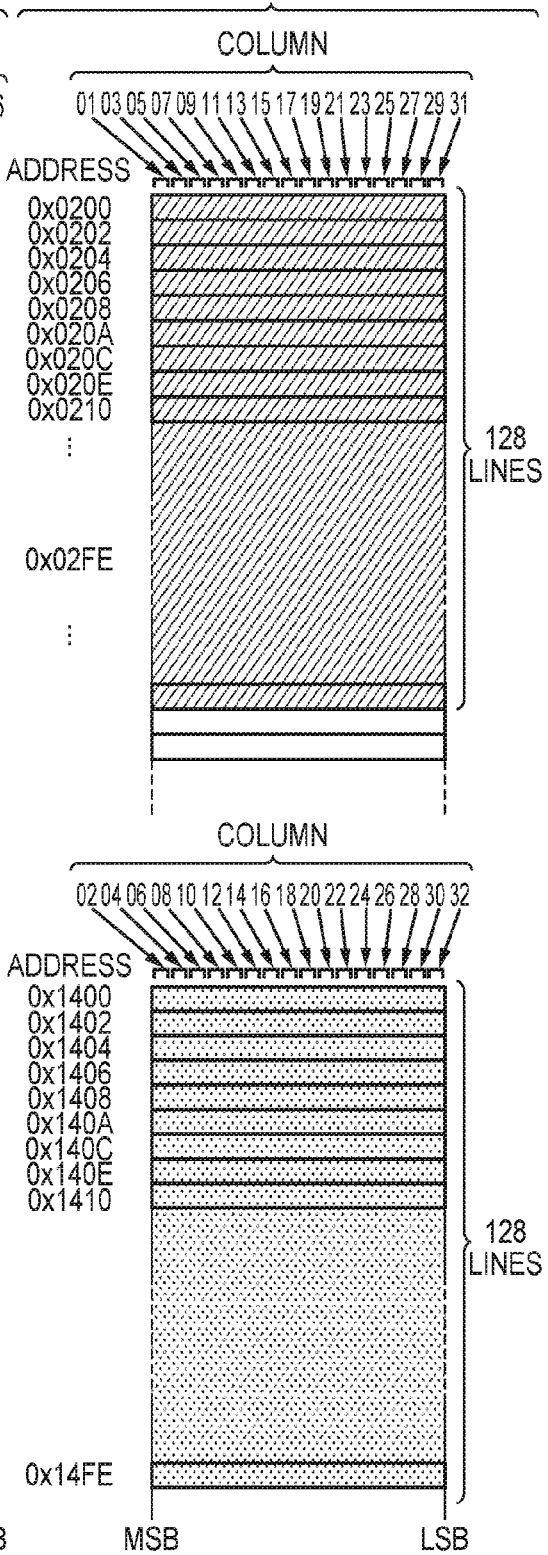

FIGS. 3A and 3B show the way the print buffer 107 stores binary data having undergone image processing. The print buffer 107 has eight bits per address. Note that 16 bits/word is also possible, but addresses shown in FIGS. 3A and 3B increase by 1 for every 16 bits in that case. The number of bits per word can of course be another value. FIG. 3A shows the structure of data in the print mode in which no column thinning is performed. FIG. 3B shows the structure of data in the print mode in which two-column thinning is performed.

Figure 6:
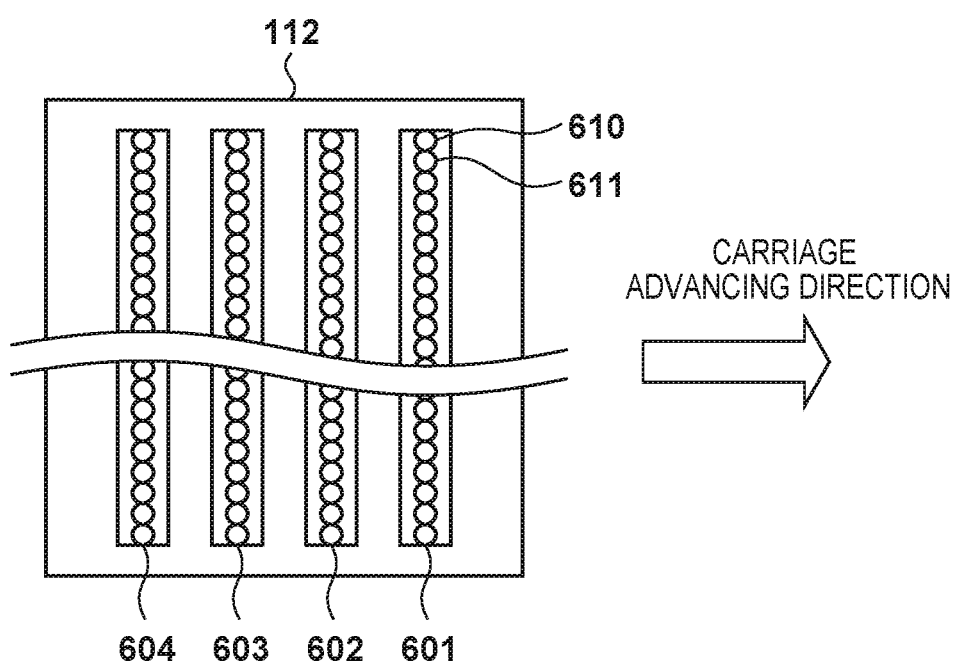
FIG. 6 is a block diagram of a printhead according to the first embodiment of the present invention.

Before explaining details of the format of image data stored in the print buffer 107, the arrangement of the printhead 112 used in this embodiment will be explained. FIG. 6 is a block diagram of the printhead 112. The printhead 112 includes a Bk head 601, C head 602, M head 603, and Y head 604. 128 nozzles are arranged in order from an upper portion on each head. Reference numeral 610 denotes the first nozzle in the nozzle row; and 611, the second nozzle. The printhead 112 moves from the left to the right on a printing sheet.

An oblique-line hatched portion in FIG. 3A shows the way data having 128 dots in the raster direction and 16 dots in the column direction is stored. The 128 dots in the raster direction are equal to a storage amount matching the height of the head. Data of the first to 16th columns for the first nozzle 610 of the Bk nozzle row are stored at address 0x0200. Data of the first to 16th columns for the second nozzle 611 are stored at address 0x0202 following 0x0200. Similarly, data of the first to 16th columns for the third, fourth, . . . , 128th nozzles are respectively stored at addresses 0x0204, 0x0206, . . . , 0x02FE.

FIG. 3A shows the way the data of 16 columns of the Bk nozzle row including 128 nozzles are stored. The image processor 104 repeats the above processing on consecutive addresses until data equivalent to the printing width (or typing width) is stored in the print buffer 107. The printing width is the raster line length×the height of the printhead, and is also called a band region. The data equivalent to the printing width contains, for each color component, print data containing the number of nozzles of the head (or the number of main scanning pixels)×the number of pixels (or the number of columns) on one raster line. When data equivalent to the printing width is stored in the print buffer 107, the image processor 104 generates an interrupt to the CPU 103. The CPU 103 having received this interrupt moves the carriage on which the printhead 112 is mounted in the scanning direction.

The encoder sensor 109 inputs the operation of the carriage to the image formation controller 100. Based on this input from the encoder sensor 109, the print data readout circuit 108 reads out data while automatically incrementing the address by using the burst readout function from address 0x0200 as the first address, at a timing generated by the printing timing generating circuit 110. In this case, registration adjustment is implemented by increasing or decreasing the readout address by an amount corresponding to a correction amount. For example, when reading out data from address 0x202 as the readout start address, data shifted downward by one dot in the nozzle row direction is read out. Likewise, when reading out data shifted upward by one dot in the nozzle row direction, the data need only be read out from address 0x1FE as the readout start address. In this example explained above, however, data is stored from address 0x200. When reading out data shifted upward by one dot, therefore, all-zero data must be written at address 0x1FE beforehand so as not to read out garbage data.

Since the head height is 128 nozzles, the print data readout circuit 108 reads out data from 128 addresses at once. When collecting only the nth bits of the data read out from the individual addresses, all printing data by which the nozzle rows of the printhead are simultaneously heated are obtained. This is so-called HV conversion. The head transfer data generating circuit 111 collects only the most significant bits of the data of the individual addresses read out to perform HV conversion, and transfers the collected bits to the printhead 112 in address order (or in reverse order). The printhead 112 simultaneously drives nozzles corresponding to the received 128-bit data in accordance with the data value, and discharges ink in accordance with the data value, thereby completing printing of the first column. Then, the head transfer data generating circuit 111 collects only the second bits from the most significant bits, transfers the collected bits to the printhead 112, and similarly completes printing of the second column.

Analogously, the head transfer data generating circuit 111 collects only the third, fourth, fifth, . . . , 16th bits from the most significant bits, transfers the collected bits to the printhead, and completes printing of the third, fourth, fifth, . . . , 16th columns. After completing printing of the 16th column, the head transfer data generating circuit 111 reads out data from the next 128 addresses, and prints the 17th and subsequent columns. The printing operation of one scan is implemented by repeating the above processing by the printing width.

<Operation Example of Interpolation Mode>

The way the image processing SRAM 106 stores data in the print mode (interpolation mode) in which two-column thinning is performed, that is, a printing apparatus control method will be explained with reference to FIG. 2B. In column thinning printing, printing of a region equivalent to one printing width is completed by scanning the printhead a plurality of times at an interval of a plurality of columns. Two-column thinning is a method of printing pixels in every other column by scanning the printhead once. After performing predetermined image processing, the image processor 104 stores data once in the image processing SRAM 106 by the arrangement as shown in FIG. 2B. Addresses 0x00 to 0x07 shown in FIG. 2B are the same as those shown in FIG. 2A, so an explanation thereof will be omitted. Data of the 17th to 32nd columns of the first raster are stored in bits D15 to D0 at address 0x10. Data of the 17th to 32nd columns of the second raster are stored in bits D31 to D16. Likewise, data of the 17th to 32nd columns of the third raster are stored in bits D47 to D32, and data of the 17th to 32nd columns of the fourth raster are stored in bits D63 to D48. Data of the 17th to 32nd columns of the fifth, sixth, seventh, . . . , 32nd rasters are similarly stored at addresses 0x11 to 0x17.

Next, the way data is transferred in the print mode in which two-column thinning is performed will be explained.

In the print mode in which two-column thinning is performed, storage of data to the print buffer 107 is started when the data of the 17th to 32nd columns of the 32nd raster are stored in the image processing SRAM 106. When data is stored at address 0x17, the image processor 104 reads out 64 bits of the data at address 0x00 and 64 bits of the data at address 0x10. That is, the image processor 104 reads out data containing 32 consecutive columns in the same raster. Eight bits D15, D13, D11, D9, D7, D5, D3, and D1 as odd-numbered bits of the first to 16th columns of the first raster in the 64-bit data read out from address 0x00, and eight bits D15, D13, D11, D9, D7, D5, D3, and D1 as odd-numbered bits of the 17th to 32nd columns of the first raster in the 64-bit data read out from address 0x10, that is, a total of 16 bits are written at address 0x0200 of the print buffer 107 such that the eight bits read out from address 0x00 are upper bits. That is, data of odd-numbered columns of the 32 consecutive columns in the same raster are written in the print buffer 107 while maintaining the order.

Then, eight bits D31, D29, D27, D25, D23, D21, D19, and D17 as odd-numbered bits of the first to 16th columns of the second raster read out from address 0x00, and eight bits D31, D29, D27, D25, D23, D21, D19, and D17 as odd-numbered bits of the 17th to 32nd columns of the second raster read out from address 0x10, are written at address 0x0202 of the print buffer 107 such that the eight bits read out from address 0x00 are upper bits.

Analogously, eight bits D47, D45, D43, D41, D39, D37, D35, and D33 as odd-numbered bits of the first to 16th columns of the third raster read out from address 0x00, and eight bits D47, D45, D43, D41, D39, D37, D35, and D33 as odd-numbered bits of the 17th to 32nd columns of the third raster read out from address 0x10, are written at address 0x0204. Subsequently, eight bits D63, D61, D59, D57, D55, D53, D51, and D49 as odd-numbered bits of the first to 16th columns of the fourth raster read out from address 0x00, and eight bits D63, D61, D59, D57, D55, D53, D51, and D49 as odd-numbered bits of the 17th to 32nd columns of the fourth raster read out from address 0x10, are written at address 0x0206.

Also, even-numbered columns are similarly stored in the print buffer 107 in parallel to the storage of the odd-numbered columns to the print buffer 107. More specifically, eight bits D14, D12, D10, D8, D6, D4, D2, and D0 as even-numbered bits of the first to 16th columns of the first raster read out from address 0x00, and eight bits D14, D12, D10, D8, D6, D4, D2, and D0 as even-numbered bits of the 17th to 32nd columns of the first raster read out from address 0x10, that is, a total of 16 bits are written at address 0x1400. Then, eight bits D30, D28, D26, D24, D22, D20, D18, and D16 as even-numbered bits of the first to 16th columns of the second raster read out from address 0x00, and eight bits D30, D28, D26, D24, D22, D20, D18, and D16 as even-numbered bits of the 17th to 32nd columns of the second raster read out from address 0x10, that is, a total of 16 bits are written at address 0x1402. Subsequently, eight bits D46, D44, D42, D40, D38, D36, D34, and D32 as even-numbered bits of the first to 16th columns of the third raster read out from address 0x00, and eight bits D46, D44, D42, D40, D38, D36, D34, and D32 as even-numbered bits of the 17th to 32nd columns of the third raster read out from address 0x10, that is, a total of 16 bits are written at address 0x1404. After that, eight bits D62, D60, D58, D56, D54, D52, D50, and D48 as even-numbered bits of the first to 16th columns of the fourth raster read out from address 0x00, and eight bits D62, D60, D58, D56, D54, D52, D50, and D48 as even-numbered bits of the 17th to 32nd columns of the fourth raster read out from address 0x10, that is, a total of 16 bits are written at address 0x1406.

Likewise, data of the first to 32nd columns of the individual rasters are read out by combining addresses 0x01 and 0x11, 0x02 and 0x12, 0x03 and 0x13, . . . , 16 bits as odd-numbered bits of the data are written at addresses 0x0208, 0x020A, 0x020C, 0x020E, . . . , 0x02FE, and 16 bits as even-numbered bits are written at 0x1408, 0x140A, 0x140C, 0x140E, . . . , 0x14FE.

The foregoing is the explanation of the procedure of storing 32-line×16-column data in the print buffer 107 for both odd-numbered columns and even-numbered columns. For example, the first to 16th columns of the 33rd to 64th rasters are stored at addresses 0x08 to 0x0F of the image processing SRAM 106 shown in FIG. 2B, and the 17th to 32nd columns of the 33rd to 64th rasters are stored at addresses 0x18 to 0x1F. In this manner, 64-line×16-column data can be stored in the print buffer 107 for both off-numbered columns and even-numbered columns by applying the abovementioned procedure. For the 65th to 128th rasters, data are stored in the image processing SRAM 106 by the same format as that shown in FIG. 2B, and the abovementioned procedure is similarly applied. Consequently, 128-line×16-column data can be stored in the print buffer 107 for both odd-numbered columns and even-numbered columns. Also, when 128-line×32-column data is stored in the image processing SRAM 106, 128-line×16-column data can be stored in the print buffer 107 for both odd-numbered columns and even-numbered columns by loading data to the image processing SRAM 106 once.

Addresses 0x0200 to 0x02FE of the print buffer 107 indicated by an oblique-line hatched portion in FIG. 3B show the way odd-numbered-column data are stored after two-column separation is performed. Note that "two-column separation" is a method of separating pixels arranged in the raster order into two groups for every other column (that is, two groups of odd-numbered columns and even-numbered columns), and printing each group as thinned data, and has the same meaning as that of two-column thinning. Note that FIGS. 3A and 3B show data of one color component, so data having the same configuration is stored in the print buffer 107 for each color component when processing color image data.

Referring to FIG. 3B, 16-column data of the first, third, fifth, seventh, ninth, . . . , 31st columns for the first nozzle 610 of the Bk nozzle row are stored at address 0x0200. Sixteen-column data of the first, third, fifth, seventh, ninth, . . . , 31st columns for the second nozzle 611 are stored at address 0x0202 following 0x0200. Likewise, data for the third, fourth, . . . , 128th nozzles are respectively stored at addresses 0x0204, 0x0206, . . . , 0x02FE.

Odd-numbered columns of columns 33 to 63 are stored at addresses 0x0300 to 0x03FE for lines 1 to 128 following the abovementioned procedure. Similarly, odd-numbered-column data are stored in the print buffer 107 to the end of the printing width (a width which is printed by scanning the carriage once).

Addresses 0x1400 to 0x14FE indicated by a dot hatched portion in FIG. 3B show the way data of even-numbered columns are stored after two-column separation is performed. Sixteen-column data of the second, fourth, sixth, eighth, 10th, . . . , 32nd columns for the first nozzle 610 of the Bk nozzle row are stored at address 0x1400. Sixteen-column data of the second, fourth, sixth, eighth, 10th, . . . , 32nd columns for the second nozzle 611 are stored at address 0x1402 following 0x1400. Likewise, data for the third, fourth, ..., 128th nozzles are respectively stored at addresses 0x1404, 0x1406, ..., 0x14FE.

Even-numbered columns of columns 34 to 64 are stored at addresses 0x1500 to 0x15FE for lines 1 to 128 following the abovementioned procedure. Similarly, even-numbered-column data are stored in the print buffer 107 to the end of the printing width (a width which is printed by scanning the carriage once).

When data equivalent to the head height (in this example, 128 dots)×the printing width (in this example, the length of one raster line) is stored in the area starting from 0x0200 and storing odd-numbered columns on the print buffer 107 (data is stored for even-numbered columns at the same time), the image processor 104 generates an interrupt for the CPU 103. The CPU 103 having received this interrupt moves the carriage on which the printhead 112 is mounted in the scanning direction.

The encoder sensor 109 inputs the operation of the carriage to the image formation controller 100. Based on this input from the encoder sensor 109, the print data readout circuit 108 reads out data from the print buffer 107 at a timing generated by the printing timing generating circuit 110. In a pass for printing odd-numbered columns, data is read out by burst readout by using address 0x0200 as the first address. Since the head height is 128 nozzles, data of 128 lines are read out at once. Since eight bits/word in this example, 128 lines are equivalent to 256-word data. Note that 128 lines are equivalent to 128-word data if 16 bits/word is given.

The head transfer data generating circuit 111 collects only the most significant bits (that is, the first columns) of the data of the individual addresses read out from the print buffer 107 in order to perform HV conversion, and transfers the collected bits to the printhead 112. The printhead 112 discharges ink by driving nozzles corresponding to the received 128-bit data in accordance with the data value, thereby completing printing of the first column. Then, the head transfer data generating circuit 111 collects only the second bits (that is, the third columns) from the most significant bits, and transfers the collected bits to the printhead 112. Since it is known that data to be printed out is the third-column data, the carriage is moved by two columns, and the printhead 112 simultaneously discharges, at the position of the third column, the received 128 bits in accordance with the data value, thereby completing printing of the third column. Likewise, only the third, fourth, fifth, ... bits of the individual locations of the data stored at addresses 0x0200 to 0x02FE of the print buffer 107 are collected and transferred to the printhead 112, thereby completing printing of odd-numbered columns, that is, the fifth, seventh, ninth, ..., 31st columns. After printing of the 31st column is complete, the next 128-line data is read out from the print buffer 107, and printing of the 33rd and subsequent columns is performed following the same procedure. A printing operation of one scan of the pass for printing odd-numbered columns is implemented by repeating the above processing for the printing width. The speed of one scan of the carriage in the two-column thinning mode can be made approximately twice that of the print mode in which no column thinning is performed. In other words, one scan can be completed by a time approximately half that of the print mode in which no column thinning is performed. Also, if there is a column which is read out and discarded, a practical readout band reduces to half that when there is no column which is read out and discarded. In this example, however, there is no column which is read out and discarded, so the practical access speed to the print buffer 107 does not decrease. In addition, if there is a column which is read out and discarded, the frequency at which data is loaded from the image processing SRAM 106 to the print buffer 107 increases, and this is a memory access overhead. However, this example can prevent this overhead.

Next, a pass for printing even-numbered columns will be explained. The pass for printing even-numbered columns has the contents that odd-numbered columns are replaced with even-numbered columns in the pass for printing odd-numbered columns described above. There is no sheet feeding between the passes for printing even-numbered columns and odd-numbered columns, and printing is performed by interpolating even-numbered columns.

First, at almost the same time data is stored by an amount of the head height×the printing width in an area starting from 0x0200 and storing odd-numbered columns on the print buffer 107, data of even-numbered columns is stored by an amount of the head height×the printing width in an area starting from 0x1400 and storing even-numbered columns. After the printing operation is complete in the pass for printing odd-numbered columns, the CPU 103 starts a printing operation by moving the carriage in the scanning direction again. In the same manner as when printing odd-numbered columns, the encoder sensor 109 inputs the operation of the carriage to the image formation controller 100. Based on this input from the encoder sensor 109, the print data readout circuit 108 reads out data at a timing generated by the printing timing generating circuit 110. In the pass for printing even-numbered columns, data readout is performed by burst readout by using address 0x1400 as the first address. Since the head height is 128 nozzles, data of 128 addresses are read out at once.

The head transfer data generating circuit 111 collects only the most significant bits of the readout data of the individual addresses in order to perform HV conversion, and transfers the collected bits to the printhead 112. The printhead simultaneously discharges inks in accordance with the values of the received 128-bit data, thereby completing printing of the second column. In this state, the carriage has been moved to the position of the second column. Then, only the second bits from the most significant bits are collected and transferred to the printhead. Since it is known that data to be printed out is data of the fourth column, the carriage is moved to the printing position of the fourth column, and the printhead 112 simultaneously discharges inks in accordance with the values of the received 128 bits, thereby completing printing of the fourth column.

Likewise, only the third, fourth, fifth, ... bits are collected and transferred to the printhead, thereby completing printing of the fourth, sixth, eighth, ... columns. After completing printing of the 32nd column, data of the next 128 addresses are read out, and printing of the 34th and subsequent columns is performed. A printing operation of one scan of the pass for printing even-numbered columns is implemented by repeating the above processing by the printing width.

When a region of one normal scan is printed by printing odd-numbered columns and even-numbered columns, the aforementioned procedure is repeated for the next region. This operation is further repeated until printing is complete.

As has been explained above, data to be stored in the print buffer 107 is raster data, and divisionally stored for scanning regions such as odd-numbered columns and even-numbered columns. Even when performing two-column thinning printing, therefore, it is possible to eliminate data which is read out and discarded, and suppress a decrease in data readout band.

Note that the above embodiment has been explained by assuming that when printing even-numbered columns, the carriage is scanned in the same direction as that when printing odd-numbered columns. When printing even-numbered columns, however, the carriage may also be scanned in the direction opposite to that when printing odd-numbered columns. In this case, printing of even-numbered columns is started from an even-numbered column at the end of the raster line, and even-numbered columns are sequentially printed until column 2 while reducing the column number. Since data equivalent to the printing width is already stored, it is possible to eliminate data which is read out and discarded, and suppress a decrease in data readout band, even when two-column thinning printing is performed by using raster data as data to be stored in the print buffer 107, as in the abovementioned example.

Note that an odd number and even number can also be regarded as residue classes of 2, and thinning printing disclosed in this embodiment can be generalized as follows. That is, letting s be the number of times of scan for completing an image, thinning printing can be generalized as a method of implementing image formation by classifying column numbers into residue classes of s, printing columns belonging to each residue class by one scan, and repeating the operation s times while changing a residue class to which printing target columns belong. A region to be printed by this s-time scan is naturally a region equivalent to the width of the printhead.

[Second Embodiment]

In the first embodiment, an example of two-column thinning is disclosed. The second embodiment discloses an example of four-column thinning. A block diagram is the same as that shown in FIG. 1, so an explanation thereof will be omitted. In this four-column thinning, column numbers are classified into residue classes of 4, and columns belonging to the same residue class are printed by one scan. This printing operation is repeated four times by changing a residue class to which printing target columns belong while avoiding duplication, thereby completing printing of a region equal to one printing operation in a normal mode. As will be explained in detail below, the principle of four-column thinning is the same as that of the operation of two-column thinning except for a distinction caused by a difference between the number of columns to be skipped in one scan and the number of times of scan for completing printing. Also, data is stored in a print buffer 107 for every 32 lines in the following explanation. However, the number of lines may also be 64 or 128.

In the print mode in which four-column thinning is performed, as shown in FIGS. 4A and 4B, an image processor 104 stores data in an image processing SRAM 106 once. Data of the first to 16th columns of the first raster are stored in bits D15 to D0 of address 0x00 shown in FIG. 4A. Data of the first to 16th columns of the second raster are stored in bits D31 to D16. Likewise, data of the first to 16th columns of the third raster are stored in bits D47 to D32, and data of the first to 16th columns of the fourth raster are stored in bits D63 to D48. Data of the first to 16th columns of the fifth, sixth, seventh, . . . , 32nd rasters are similarly stored at addresses 0x01 to 0x07.

Data of the 17th to 32nd columns of the first raster are stored in bits D15 to D0 of address 0x10 shown in FIG. 4A. Data of the 17th to 32nd columns of the second raster are stored in bits D31 to D16. Likewise, data of the 17th to 32nd columns of the third raster are stored in bits D47 to D32, and data of the 17th to 32nd columns of the fourth raster are stored in bits D63 to D48. Data of the 17th to 32nd columns of the fifth, sixth, seventh, . . . , 32nd rasters are similarly stored at addresses 0x11 to 0x17.

Data of the 33rd to 48th columns of the first raster are stored in bits D15 to D0 of address 0x20 shown in FIG. 4B. Data of the 33rd to 48th columns of the second raster are stored in bits D31 to D16. Likewise, data of the 33rd to 48th columns of the third raster are stored in bits D47 to D32, and data of the 33rd to 48th columns of the fourth raster are stored in bits D63 to D48. Data of the 33rd to 48th columns of the fifth, sixth, seventh, . . . , 32nd rasters are similarly stored at addresses 0x21 to 0x27.

Data of the 49th to 64th columns of the first raster are stored in bits D15 to D0 of address 0x30 shown in FIG. 4B. Data of the 49th to 64th columns of the second raster are stored in bits D31 to D16. Likewise, data of the 49th to 64th columns of the third raster are stored in bits D47 to D32, and data of the 49th to 64th columns of the fourth raster are stored in bits D63 to D48. Data of the 49th to 64th columns of the fifth, sixth, seventh, . . . , 32nd rasters are similarly stored at addresses 0x31 to 0x37.

Figure 5A:
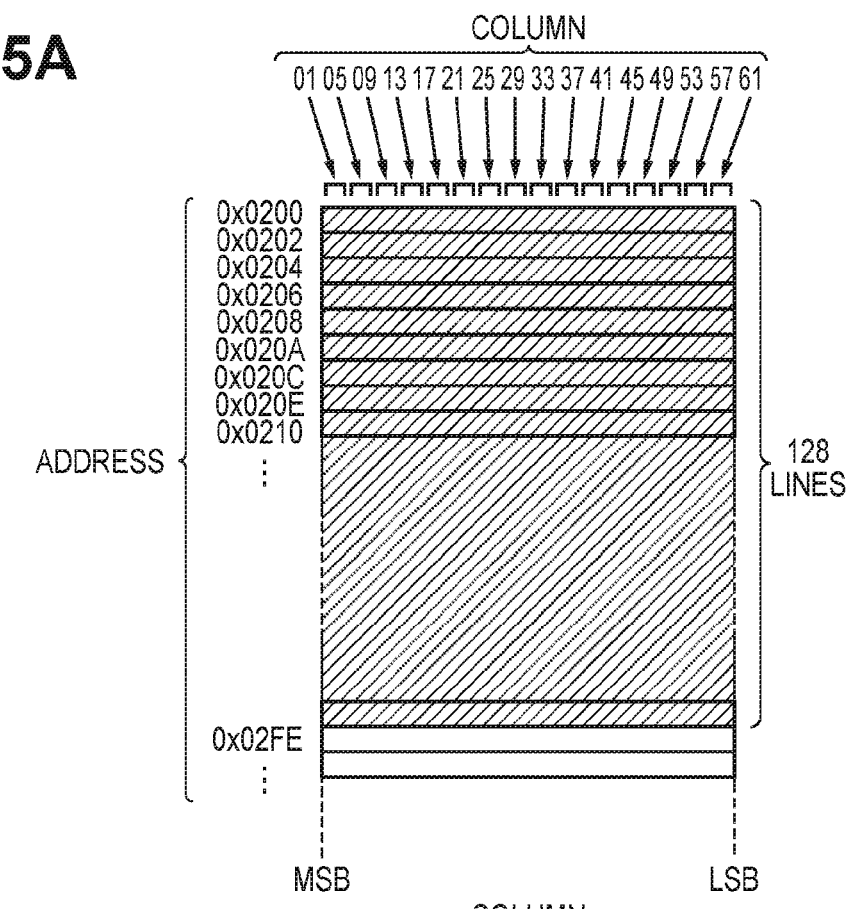
FIGS. 5A, 5B, 5C, and 5D are views showing a print buffer according to the second embodiment of the present invention.
Figure 5B:
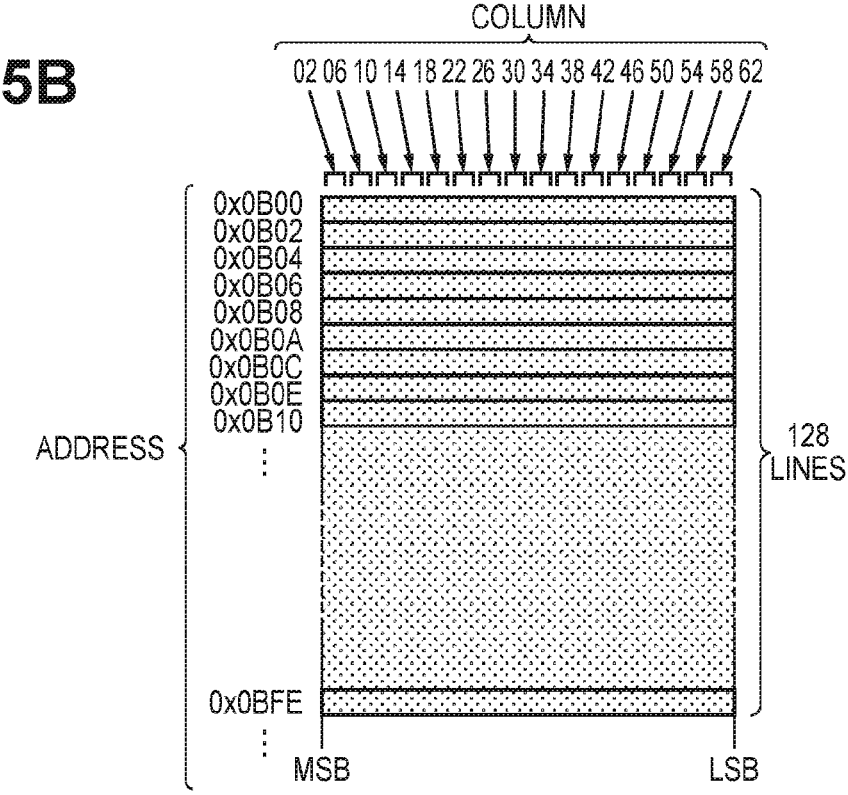
Figure 5C:
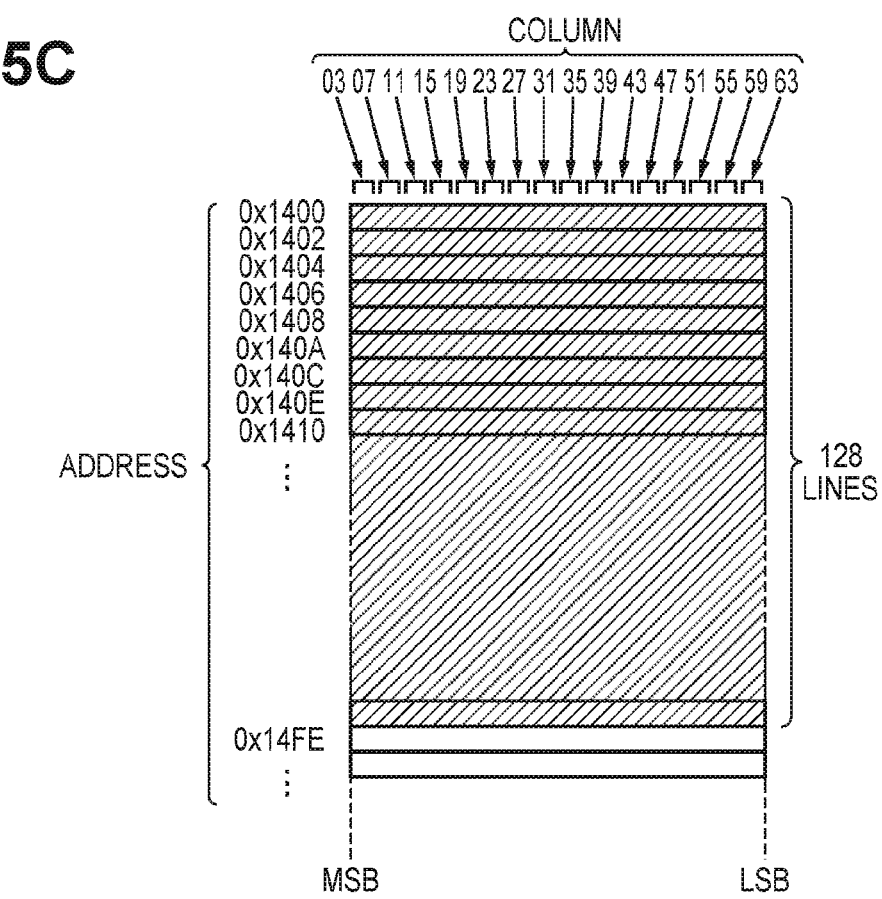
Figure 5D:
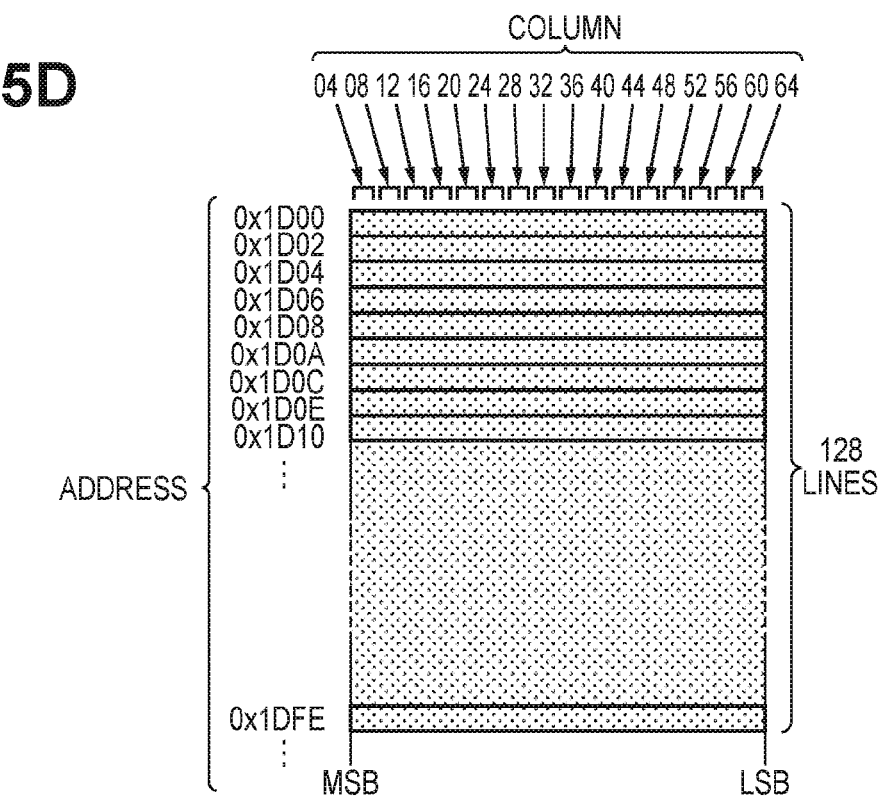

In the print mode of performing four-column thinning, data storage to the print buffer 107 is started when the data of the 49th to 64th columns of the 32nd raster are stored in the image processing SRAM 106. When data is stored at address 0x37, the image processor 104 reads out data from addresses 0x00, 0x10, 0x20, and 0x30. That is, data containing 64 consecutive columns in the same raster are read out. FIGS. 5A to 5D show examples of data stored in the print buffer 107. FIG. 5A shows data of every four columns from the first column. FIG. 5B shows data of every four columns from the second column. FIG. 5C shows data of every four columns from the third column. FIG. 5D shows data of every four columns from the fourth column.

To separate the first column, bits D15, D11, D07, and D03 at address 0x00, bits D15, D11, D07, and D03 at address 0x10, bit D15, D11, D07, and D03 at address 0x20, and bits D15, D11, D07, and D03 at address 0x30, that is, a total of 16 bits are written at address 0x0200 of the print buffer 107. Then, bits D31, D27, D23, and D19 at address 0x00, bits D31, D27, D23, and D19 at address 0x10, bits D31, D27, D23, and D19 at address 0x20, and bits D31, D27, D23, and D19 at address 0x30, that is, a total of 16 bits are written at address 0x0202 of the print buffer 107. Subsequently, bits D47, D43, D39, and D35 at address 0x00, bits D47, D43, D39, and D35 at address 0x10, bits D47, D43, D39, and D35 at address 0x20, and bits D47, D43, D39, and D35 at address 0x30, that is, a total of 16 bits are stored at address 0x0204 of the print buffer 107. After that, bits D63, D59, D55, and D51 at address 0x00, bits D63, D59, D55, and D51 at address 0x10, bits D63, D59, D55, and D51 at address 0x20, and bits D63, D59, D55, and D51 at address 0x30, that is, a total of 16 bits are written at address 0x0204 of the print buffer 107. In this process, the first column of four-column separation is separated and stored in an area of addresses 0x0200 to 0x0207. That is, of the 64 consecutive columns of the first raster, data of columns having a remainder of 3 when 4 is a normal are written in the print buffer 107 while maintaining the order.

To separate the second column, bits D14, D10, D06, and D02 at address 0x00, bits D14, D10, D06, and D02 at address 0x10, bits D14, D10, D06, and D02 at address 0x20, and bits D14, D10, D06, and D02 at address 0x30, that is, a total of 16 bits are written at address 0x0B00 of the print buffer 107. Then, bits D30, D26, D22, and D18 at address 0x00, bits D30, D26, D22, and D18 at address 0x10, bits D30, D26, D22, and D18 at address 0x20, and bits D30, D26, D22, and D18 at address 0x30, that is, a total of 16 bits are written at address 0x0B02 of the print buffer 107.

Subsequently, bits D46, D42, D38, and D34 at address 0x00, bits D46, D42, D38, and D34 at address 0x10, bits D46, D42, D38, and D34 at address 0x20, and bits D46, D42, D38, and D34 at address 0x30, that is, a total of 16 bits are written at address 0x0B04 of the print buffer 107. After that, bits D62, D58, D54, and D50 at address 0x00, bits D62, D58, D54, and D50 at address 0x10, bits D62, D58, D54, and D50 at address 0x20, and bits D62, D58, D54, and D50 at address 0x30, that is, a total of 16 bits are written at address 0x0B08 of the print buffer 107. In this process, the second column of four-column separation is separated and stored in an area of addresses 0x0B00 to 0x0B07. That is, of the 64 consecutive columns of the second raster, data of columns having a remainder of 2 when 4 is a normal are written in the print buffer 107 while maintaining the order.

To separate the third column, bits D13, D09, D05, and D01 at address 0x00, bits D13, D09, D05, and D01 at address 0x10, bits D13, D09, D05, and D01 at address 0x20, and bits D13, D09, D05, and D01 at address 0x30, that is, a total of 16 bits are written at address 0x1400 of the print buffer 107. Then, bits D29, D25, D21, and D17 at address 0x00, bits D29, D25, D21, and D17 at address 0x10, bits D29, D25, D21, and D17 at address 0x20, and bits D29, D25, D21, and D17 at address 0x30, that is, a total of 16 bits are written at address 0x1402 of the print buffer 107. Subsequently, bits D45, D41, D37, and D33 at address 0x00, bits D45, D41, D37, and D33 at address 0x10, bits D45, D41, D37, and D33 at address 0x20, and bits D45, D41, D37, and D33 at address 0x30, that is, a total of 16 bits are written at address 0x1404 of the print buffer 107. After that, bits D61, D57, D53, and D49 at address 0x00, bits D61, D57, D53, and D49 at address 0x10, bits D61, D57, D53, and D49 at address 0x20, and bits D61, D57, D53, and D49 at address 0x30, that is, a total of 16 bits are written at address 0x1406 of the print buffer 107. In this process, the third column of four-column separation is separated and stored in an area of addresses 0x1400 to 0x1407. That is, of the 64 consecutive columns of the third raster, data of columns having a remainder of 1 when 4 is a normal are written in the print buffer 107 while maintaining the order.

To separate the fourth column, bits D12, D08, D04, and D00 at address 0x00, bits D12, D08, D04, and D00 at address 0x10, bits D12, D08, D04, and D00 at address 0x20, and bits D12, D08, D04, and D00 at address 0x30, that is, a total of 16 bits are written at address 0x1D00 of the print buffer 107. Then, bits D28, D24, D20, and D16 at address 0x00, bits D28, D24, D20, and D16 at address 0x10, bits D28, D24, D20, and D16 at address 0x20, and bits D28, D24, D20, and D16 at address 0x30, that is, a total of 16 bits are written at address 0x1D02 of the print buffer 107. Subsequently, bits D44, D40, D36, and D32 at address 0x00, bits D44, D40, D36, and D32 at address 0x10, bits D44, D40, D36, and D32 at address 0x20, and bits D44, D40, D36, and D32 at address 0x30, that is, a total of 16 bits are written at address 0x1D04 of the print buffer 107. After that, bits D60, D56, D52, and D48 at address 0x00, bits D60, D56, D52, and D48 at address 0x10, bits D60, D56, D52, and D48 at address 0x20, and bits D60, D56, D52, and D48 at address 0x30, that is, a total of 16 bits are written at address 0x1D06 of the print buffer 107. In this process, the fourth column of four-column separation is separated and stored in an area of addresses 0x1D00 to 0x1D07. That is, of the 64 consecutive columns of the fourth raster, data of columns having a remainder of 0 when 4 is a normal are written in the print buffer 107 while maintaining the order.

Analogously, from data read out by combining addresses 0x01, 0x11, 0x21, and 0x31, the first column is written at addresses 0x0208 to 0x020F of the print buffer 107, the second column is written at addresses 0x0B08 to 0x0B0F, the third column is written at addresses 0x1408 to 0x140F, and the fourth column is written at addresses 0x1D08 to 0x1D0F. From data read out by combining addresses 0x02, 0x12, 0x22, and 0x32, the first column is written at addresses 0x0210 to 0x021F, the second column is written at addresses 0x0B10 to 0x0B1F, the third column is written at addresses 0x1410 to 0x141F, and the fourth column is written at addresses 0x1D10 to 0x1D1F. The above processing is repeated to the 32nd raster, that is, to addresses 0x07 to 0x37 of the image processing SRAM 106. In addition, when the first to fourth columns are stored in the print buffer 107 until the 32nd raster, the process of storing the columns in the image processing SRAM 106 is executed for the subsequent rasters, and the above processing is repeated four times until the 128th raster by processing 32 rasters at one time. Consequently, data of 128 lines×16 columns are stored in the area storing the first column on the print buffer 107. By repetitively performing this process to the end of the printing width, data equivalent to the head height×the printing width is stored in the print buffer 107. At the timing at which the data is stored, the image processor 104 generates an interrupt to the CPU 103. The CPU 103 having received this interrupt moves the carriage in the scanning direction, thereby starting a first column printing operation. An encoder sensor inputs the operation of the carriage to an image formation controller 100.

Based on this input from an encoder sensor 109, a print data readout circuit 108 reads out data at a timing generated by a printing timing generating circuit 110.

In a first-column printing pass, data readout is performed by burst readout by using address 0x0200 as the first address. Since the head height of the head is 128 nozzles, the print data readout circuit 108 reads out data from 128 addresses at once, and transfers the readout data to a head transfer data generating circuit 111.

In the same manner as when performing two-column thinning, the head transfer data generating circuit 111 collects only the most significant bits of the readout data of the individual addresses in order to perform HV conversion, and transfers the collected data to the printhead. The printhead simultaneously discharges the received 128-bit data, thereby completing printing of the first column. Then, the head transfer data generating circuit 111 collects only the second bits from the most significant bits, and transfers the collected bits to the printhead. Since it is known that data to be printed out is data of the fifth column, the printhead can move at a speed four times higher than that of a print mode of performing no column thinning. The printhead discharges the received 128 bits at the same time, thereby completing printing of the fifth column. Likewise, only the third, fourth, fifth, . . . bits are collected and transferred to the printhead, thereby completing printing of the fifth, ninth, 13th, . . . columns. After printing of the 61st column is complete, data of the next 128 addresses are read out, and printing of the 65th and subsequent columns is performed. By repeating the above processing by the printing width, a printing operation of one scan of the first-column printing pass is implemented.

After the first-column printing operation is complete, a printing operation of a second-column printing pass is started. The CPU 103 starts the printing operation by moving the carriage in the scanning direction. As explained above, the encoder sensor 109 inputs the operation of the carriage to the image formation controller 100. Based on this input from the encoder sensor 109, the print data readout circuit 108 reads out data at a timing generated by the printing timing generating circuit 110, and transfers the data from the print buffer 107 to the head transfer data generating circuit 111. In the second-column printing pass, data readout is performed by burst readout by using address 0x0B00 as the first address. Since the head height of the head is 128 nozzles, data of 128 addresses are read out at one time. The head transfer data generating circuit 111 collects only the most significant bits of the readout data of the individual addresses in order to perform HV conversion, and transfers the collected bits to the printhead. The printhead simultaneously discharges the received 128-bit data, thereby completing printing of the second column. Then, only the second bits from the most significant bits are collected and transferred to the printhead. Since it is known that data to be printed out is data of the sixth column, the printhead can move at a speed four times higher than that of the print mode which does not perform column thinning. The printhead simultaneously discharges the received 128 bits, thereby completing printing of the sixth column. Analogously, only the third, fourth, fifth, . . . bits are collected and transferred to the printhead, thereby completing printing of the sixth, 10th, 14th, . . . columns. After completing printing of the 62nd column, data of the next 128 addresses are read out, and printing of the 66th and subsequent columns is performed. By repeating the above processing by the printing width, a printing operation of one scan of the second-column printing pass is implemented.

Likewise, data in an area starting from address 0x1400 is read out in a third-column printing pass, and data in an area starting from address 0x1C00 is read out in a fourth-column printing pass. Four-column thinning printing can be performed by performing printing operations after that.

As has been explained above, even when performing four-column thinning printing by using raster data as data to be stored in the print buffer 107, it is possible to eliminate data which is read out and discarded, and suppress a decrease in data readout band.

Note that odd-numbered columns and even-numbered columns can be printed by scan in different directions in this embodiment as well. In the above two embodiments, binary bitmap data is stored in the print buffer 107, and an image is printed on a medium based on this binary data. However, multilevel data may also be used. In this case, processing differs from that when using binary data in that the number of bits per pixel is two or more, and the printhead changes the printing density or dot size in accordance with multiple levels. The above embodiments are applicable except for these differences. However, it is also possible to perform no thinning printing when using multilevel data. This is so because a slight misregistration of a dot changes the color or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110800, filed May 29, 2015 which is hereby incorporated by reference herein in its entirety.

What is claimed is:

1. A printing apparatus which performs printing based on image data by scanning a printhead including a plurality of printing elements arranged in an arrangement direction intersecting a scan direction of a scan of the printhead, comprising:
    a print buffer configured to store image data;
    a conversion unit configured to HV-convert image data, which rearranges raster data in which pixels are sequentially arranged in a direction corresponding to the scan of the printhead, into data in which the pixels are arranged in accordance with the arrangement of the plurality of printing elements, and supply the image data to the printhead; and
    a transfer unit configured to read out data stored in the print buffer and transfer the data to the conversion unit,
    wherein the print buffer stores image data divided into column groups used for printing in the same scan among a plurality of scans of the printhead for completing printing of a region equivalent to one printing width, wherein each of the column groups is a group of pixels arranged in a direction of a column corresponding to the arrangement direction, such that:
    in each address of the first region of the print buffer, image data of the pixels of a first column group to be used for a first scan of the printhead are stored in a sequence of use of the image data of the pixels consecutively, the image data of the pixels stored in the same address are of the same raster line corresponding to the scan direction, and
    in each address of a second region of the print buffer different than the first region, image data of the pixels of a second column group to be used for a second scan of the printhead are stored in a sequence of use of the pixels consecutively, image data of the pixels stored in the same address are of the same raster line corresponding to the scan direction, the second column group is different than the first column group and the second scan of the printhead is different than the first scan of the printhead, and in accordance with the image data to be printed, the transfer unit transfers the image data by column group to the conversion unit.

2. The apparatus according to claim 1, wherein the conversion unit HV-converts image data transferred by the transfer unit and supplies the image data to the printhead, and the printhead prints a column corresponding to the supplied image data.

3. The apparatus according to claim 1, wherein the first column group includes columns of the image data and the second column group includes columns each of which is between adjacent columns of the first column group.

4. The apparatus according to claim 1, wherein the column group is a group obtained by classifying column numbers of image data by a residue class of the number of times of scan of the printhead, and the transfer unit transfers each group of image data to the conversion unit for each scan corresponding to the column group.

5. The apparatus according to claim 1, further comprising a memory configured to store image data,
wherein the print buffer stores image data stored in the memory such that the image data is divided into image data groups corresponding to the number of times of scan by the printhead, which completes printing of a region equivalent to one printing width.

6. The apparatus according to claim 1, wherein the transfer unit reads out data stored in the print buffer by using a burst mode and transfers the data to the conversion unit.

7. The apparatus according to claim 1, wherein the image data is color image data, the print buffer stores image data for each color component, and the printhead comprises a printhead for each color component.

8. The apparatus according to claim 1, wherein the image data is binary image data.

9. A control method of a printing apparatus which includes a print buffer for storing image data, and performs printing based on printing data by scanning a printhead including a plurality of printing elements arranged in an arrangement direction intersecting a scan direction of a scan of the printhead, comprising:
causing a conversion unit to HV-convert image data, which rearranges raster data in which pixels are sequentially arranged in direction corresponding to the scan of the printhead, into data in which the pixels are arranged in accordance with the arrangement of the plurality of printing elements, and supply the image data to the printhead; and
causing a transfer unit to read out data stored in the print buffer and transfer the data to the conversion unit,
wherein the print buffer stores divided image data divided into column groups used for printing in the same scan among a plurality of scans of the printhead for completing printing of a region equivalent to one printing width, wherein each of the column groups is a group of pixels arranged in a direction of a column corresponding to the arrangement direction, such that:
in each address of a first region of the print buffer, image data of the pixels of a first column group to be used for a first scan of the printhead are stored in a sequence of use of the image data of the pixels consecutively, the image data of the pixels stored in the same address are of the same raster line corresponding to the scan direction, and
in each address of a second region of the print buffer different than the first region, image data of the pixels of a second column group to be used for a second scan of the printhead are stored in a sequence of use of the pixels consecutively, the image data of the pixels stored in the same address are of the same raster line corresponding to the scan direction, the second column group is different than the first column group and the second scan of the printhead is different than the first scan of the printhead, and
in accordance with the image data to be printed, the transfer unit transfers the image data by column group to the conversion unit.

10. The method according to claim 9, further comprising causing the conversion unit to HV-convert image data transferred by the transfer unit and supply the image data to the printhead, wherein the printhead prints a column corresponding to the supplied image data.

11. The method according to claim 9, wherein the first column group includes columns of the image data and the second column group includes columns each of which is between adjacent columns of the first column group.

12. The method according to claim 9, wherein the column group is a group obtained by classifying column numbers of image data by a residue class of the number of times of scan of the printhead, and the transfer unit transfers each group of image data to the conversion unit for each scan corresponding to the column group.

13. The method according to claim 9, further comprising causing a memory to store image data,
wherein the print buffer stores image data stored in the memory such that the image data is divided into image data groups corresponding to the number of times of scan by the printhead, which completes printing of a region equivalent to one printing width.

14. The method according to claim 9, further comprising causing the transfer unit to read out data stored in the print buffer by using a burst mode and transfers the data to the conversion unit.

15. The method according to claim 9, wherein the image data is color image data, the print buffer stores image data for each color component, and the printhead comprises a printhead for each color component.

16. The method according to claim 9, wherein the image data is binary image data.

17. The apparatus according to claim 3, wherein the first column group includes odd columns in the sequence of columns and the second column group includes even columns in the sequence of columns.

18. The apparatus according to claim 1, wherein in the first and second regions of the print buffer, consecutive raster lines in the image data are stored in the consecutive addresses of the print buffer.

19. The apparatus according to claim 1, wherein the apparatus operates in a first mode or a second mode, wherein in the first mode,
in each address of the first region of the print buffer, the image data of the pixels of the first column group to be used for the first scan of the printhead are stored in a sequence of use of the image data of the pixels consecutively, the image data of the pixels stored in the same address are of the same raster line corresponding to the scan direction, and
in each address of the second region of the print buffer different than the first region, the image data of the pixels of the second column group to be used for the second scan of the printhead are stored in a sequence of use of the pixels consecutively, the image data of the pixels stored in the same address are of the same raster line corresponding to the scan direction, the second column group is different than the first column group and the second scan of the printhead is different than the first scan of the printhead, and in the second mode, in each address of the first region of the print buffer, the image data of the pixels of the first column group and the image data of the pixels of the second column group are stored in a sequence of use of the image data of the pixels consecutively, the image data of the pixels stored in the same address are of the same raster line corresponding to the scan direction, and the image data of the pixels of the first column group and the image data of the pixels in the second column group are used in the same scan of the printhead.

* * * * *